United States Patent
Matsumoto

(10) Patent No.: US 8,023,859 B2
(45) Date of Patent: Sep. 20, 2011

(54) IMAGE FORMING APPARATUS

(75) Inventor: Toshiya Matsumoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 297 days.

(21) Appl. No.: 12/469,327

(22) Filed: May 20, 2009

(65) Prior Publication Data

US 2009/0297210 A1 Dec. 3, 2009

(30) Foreign Application Priority Data

May 29, 2008 (JP) ................................ 2008-140450

(51) Int. Cl.
*G03G 15/00* (2006.01)
(52) U.S. Cl. ............. 399/110; 399/125; 16/239; 16/357
(58) Field of Classification Search .................. 399/110, 399/125; 016/239, 357
See application file for complete search history.

(56) References Cited

U.S. PATENT DOCUMENTS

| | | | | |
|---|---|---|---|---|
| 5,570,493 A | * | 11/1996 | Gulick | 16/357 |
| 6,055,394 A | * | 4/2000 | Suda et al. | 399/125 |
| 2006/0029424 A1 | * | 2/2006 | Kawai et al. | 399/125 |
| 2006/0088336 A1 | * | 4/2006 | Hirose et al. | 399/110 |
| 2007/0002396 A1 | | 1/2007 | Naruse | |
| 2007/0292159 A1 | * | 12/2007 | Iijima | 399/110 |

FOREIGN PATENT DOCUMENTS

| | | |
|---|---|---|
| JP | 09-179364 A | 7/1997 |
| JP | 2006184530 A | 7/2006 |
| JP | 2007010949 A | 1/2007 |

* cited by examiner

*Primary Examiner* — Ryan D Walsh
(74) *Attorney, Agent, or Firm* — Fitzpatrick, Cella, Harper & Scinto

(57) ABSTRACT

An image forming apparatus comprising: a recording unit; a reading unit rotatably supported to the upper portion of the recording unit so as to be openable and closable about one end as a fulcrum and reads an original; an L-shaped guide groove which is provided for the recording unit and in which a long groove portion and a short groove portion are connected by a bending portion; and a stay at one end is fitted into the guide groove and coupled therewith, the other end is swingably coupled with the reading unit. The guide groove has a restricting mechanism configured to alternately guide the projecting portion to the long groove portion and the short groove portion when the projecting portion moves from the bending portion.

3 Claims, 4 Drawing Sheets

IMAGE FORMING APPARATUS

BACKGROUND OF THE INVENTION

1. Field of the Invention

The present invention relates to an image forming apparatus in which a reading unit is closably attached to an upper portion of a recording unit and which has a scanner function, a printer function, a copying function, or the like.

2. Description of the Related Art

Among image forming apparatuses each having a recording unit for forming an image onto a sheet and a reading unit for reading an original, there is an image forming apparatus with a construction in which the reading unit is closably attached to the recording unit. According to such a construction, by opening the reading unit, an access to a discharge tray just under the reading unit or an access into the recording unit for the purpose of executing a jam process or a maintenance operation can be easily performed.

Japanese Patent Application Laid-Open No. 2007-010949 discloses an apparatus in which a pair of stays are rotatably supported to both sides of an upper portion of a recording unit and the other edge of each stay is slidably connected along a guide groove formed in a reading unit. The stay is urged by a spring in such a direction as to open the reading unit. A moment in such a direction as to open the reading unit acts on the reading unit by the urging force even in consideration of a moment that is caused by a weight of the reading unit itself and the reading unit is held in its opening state, thereby avoiding a drop shock and preventing a finger of the operator from being nipped when the reading unit is closed.

However, a relatively strong spring force is necessary in order to hold the reading unit in its opening state. In a state where the reading unit was closed, the spring has further been charged and locked. In order to prevent a creep due to the spring force, it is necessary that ambient parts are formed in rigid shapes and are made of a strong material. A structure is also complicated. Due to those reasons, a size and costs of the apparatus are increased.

Japanese Patent Application Laid-Open No. 2006-184530 discloses an image forming apparatus in which a stay is rotatably supported to a recording unit and a projection provided for a reading unit is slidably connected along a guide groove formed in the stay. According to the apparatus, the guide groove formed in the stay is formed by a ring-shaped groove having: a first groove along which the projection slides when the reading unit is opened; and a second groove along which the projecting portion slides when the reading unit is closed. The apparatus is constructed in such a manner that the projection of the stay is circulated once along the guide groove by the one opening/closing operation. A stay position control spring for preventing a backward-running or an ahead-running of the stay and the like are also provided. The second groove is narrower than the projection. When the projection moves in the second groove, the projection is flexuously deformed, thereby preventing the drop shock, finger-nipping of the operator, or the like when the reading unit is closed. If the reading unit is slightly closed after the reading unit was opened to a full-open state from the closed state, the reading unit can be held in the opening state. When the reading unit is opened to the full-open state again, the reading unit can be closed.

However, since the ring-shaped guide groove constructed by the two different paths at the time when the reading unit is opened and when it is closed is necessary, a space efficiency is low and an enlargement in size of the apparatus is caused. In such an apparatus, by arranging the guide groove near an opening/closing axis of the reading unit, the ring-shaped guide groove can be miniaturized. However, when the reading unit is held at the opening position, since a load caused by an external force increases depending on leverage, it is necessary to take such a countermeasure that a strong material adapted to endure the unprepared operation of the operator is used or the like, resulting in an increase in costs. Since the backward-running or the ahead-running of the stay is prevented by the position control, there is also a case where even if the external force which is applied to the stay is very small, the backward-running or the ahead-running occurs and the opening/closing operation of the reading unit becomes unstable.

The invention is made in consideration of such a technical problem. It is an object of the invention to provide an image forming apparatus in which a reading unit is closably constructed for a recording unit, wherein an opening/closing operability of the reading unit can be improved without enlarging a size of apparatus.

SUMMARY OF THE INVENTION

According to the invention, there is provided an image forming apparatus comprising: a recording unit configured to form an image onto a sheet; a reading unit which is provided in an upper portion of the recording unit so as to be openable and closable about one end as a fulcrum and reads an original; an L-shaped guide groove which is provided for one of the recording unit and the reading unit and in which a long groove portion and a short groove portion are connected by a bending portion; and a stay in which a projecting portion provided at one end is fitted into the guide groove and coupled therewith, the other end is swingably coupled with the other one of the recording unit and the reading unit, and the projecting portion moves reciprocatively along the guide groove in an interlocking relational manner with an opening/closure of the reading unit, wherein in a state where the projecting portion is located in the bending portion, the reading unit is in an opening state, in a state where the reading unit has been rotated to its closed state, the projecting portion is located in the long groove portion, in a state where the reading unit is held at its opening position, the projecting portion is located in the short groove portion, and the guide groove has a restricting mechanism configured to alternately guide the projecting portion to the long groove portion and the short groove portion when the projecting portion moves from the bending portion.

Further features of the present invention will become apparent from the following description of exemplary embodiments with reference to the attached drawings.

DESCRIPTION OF THE EMBODIMENTS

First Exemplary Embodiment

Figure 1A:
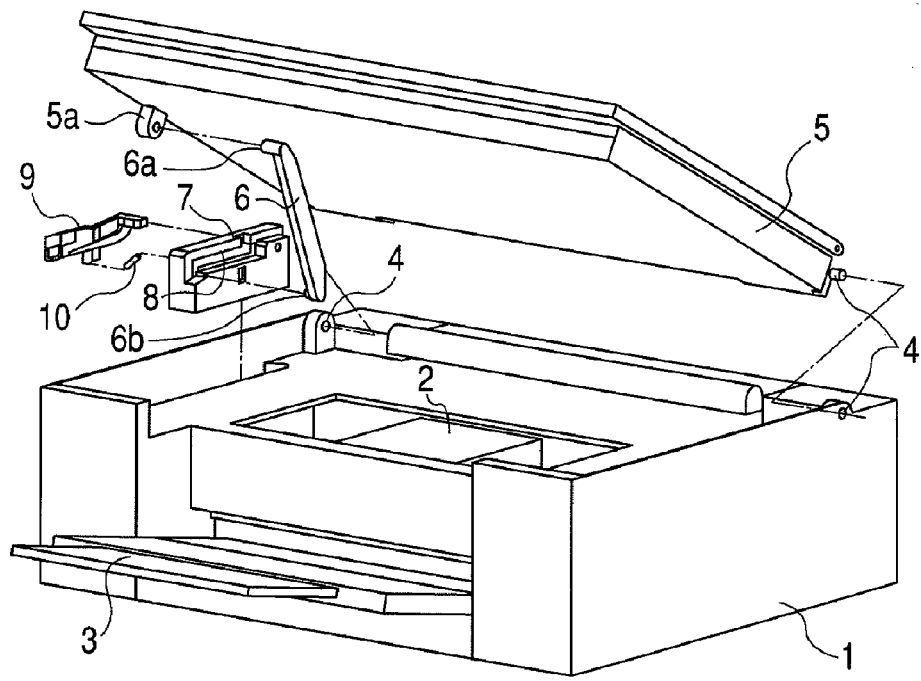
FIG. 1A is an exploded perspective view illustrating a main section of an image forming apparatus according to an embodiment of the present invention.
Figure 1B:
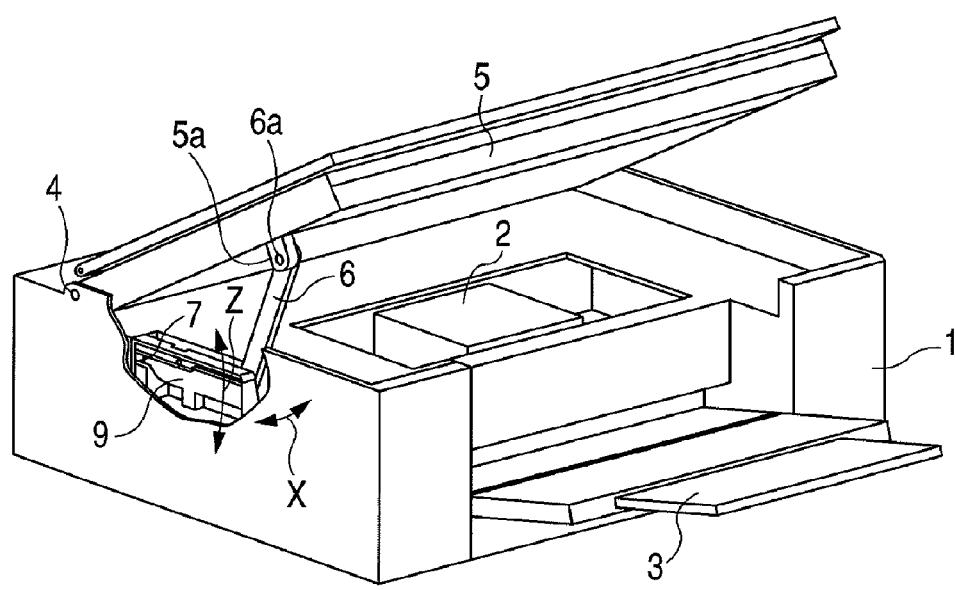
FIG. 1B is a perspective view with a part cut away at the time when a reading unit of the image forming apparatus according to the embodiment is opened.
Figure 2A:
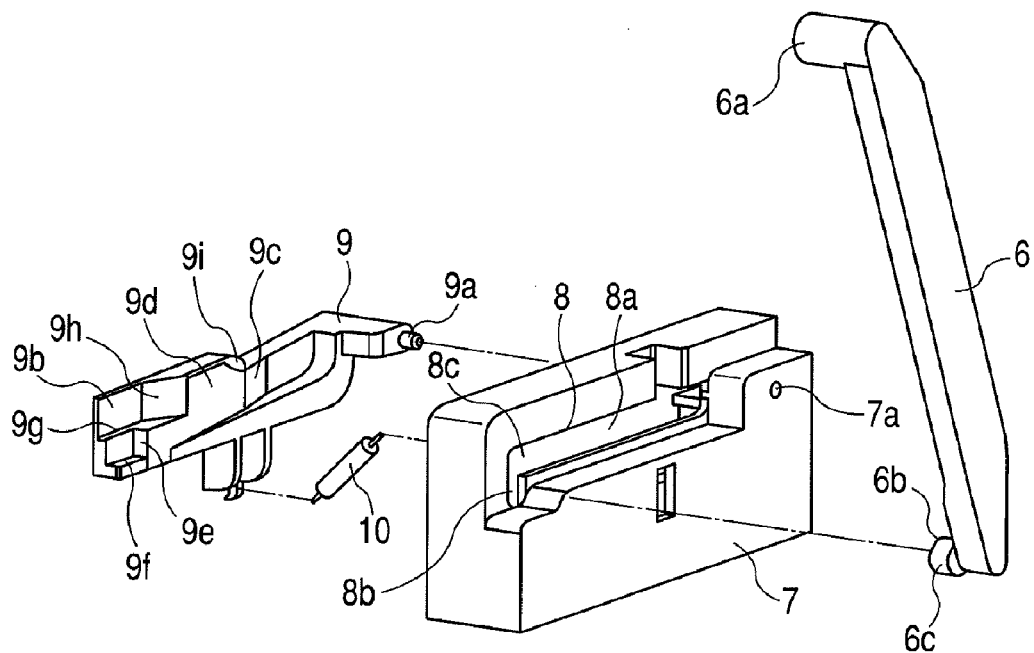
FIG. 2A is an exploded perspective view of an opening/closing mechanism of the reading unit when seen from the right-front direction.
Figure 2B:
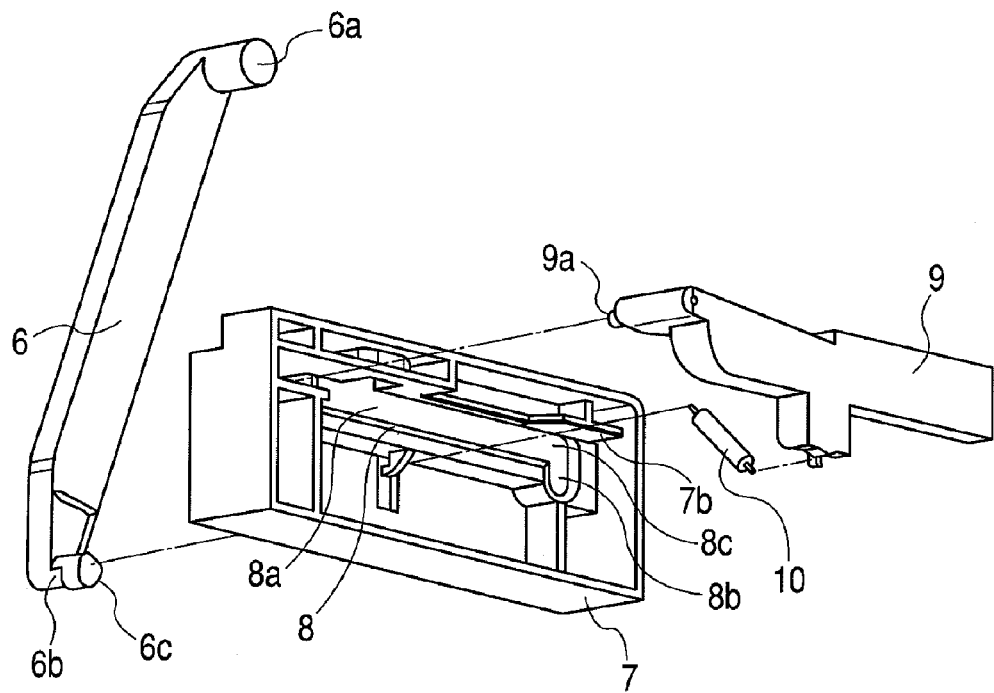
FIG. 2B is an exploded perspective view of the opening/closing mechanism of the reading unit when seen from the left-rear direction.
Figure 3:
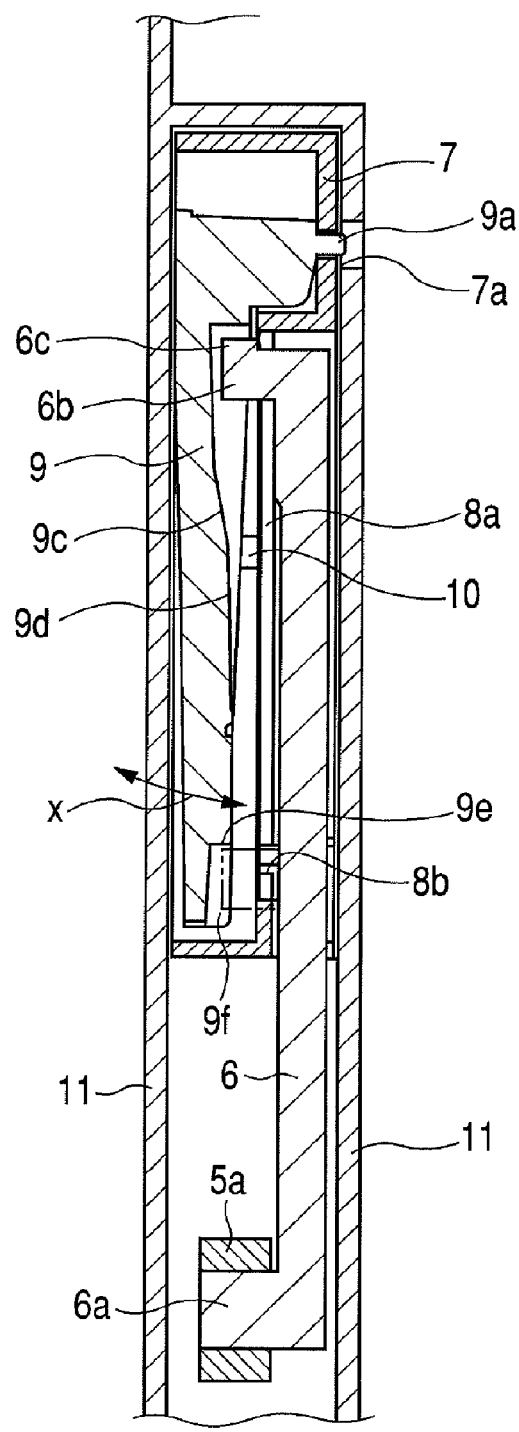
FIG. 3 is a cross sectional plan view of a stay and a cam lever at the time when the reading unit is closed.
Figure 4A:
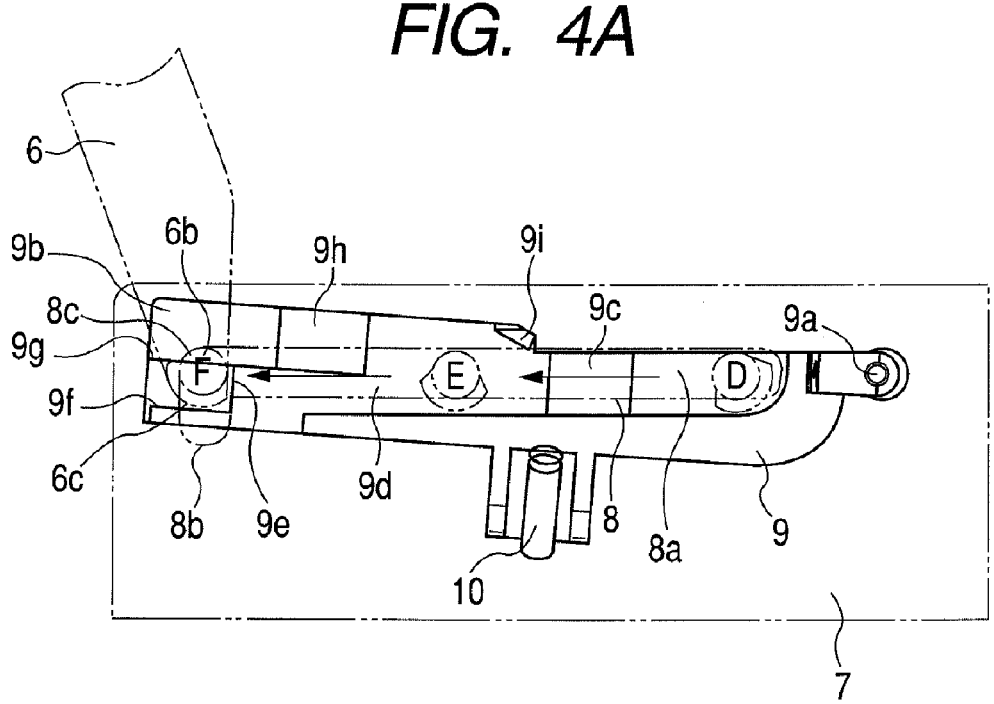
FIG. 4A is a right side elevational view illustrating the cam lever operation at the time when the reading unit is opened.
Figure 4B:
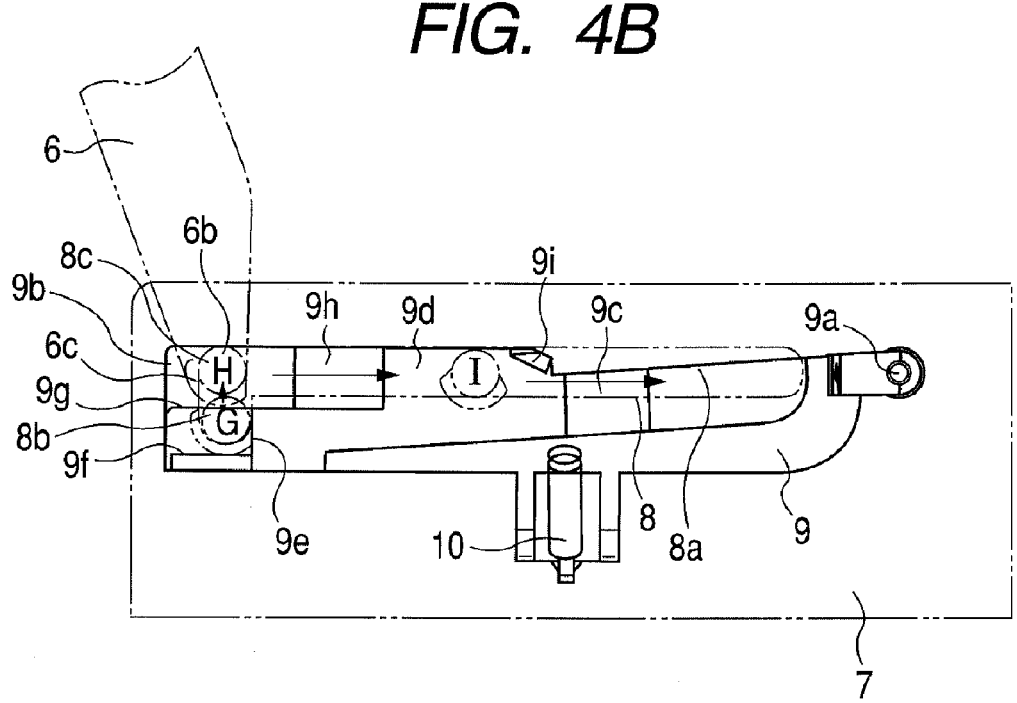
FIG. 4B is a right side elevational view illustrating the cam lever operation at the time when the reading unit is closed.

An embodiment of the invention will be described hereinbelow. FIG. 1A is an exploded perspective view illustrating a main section of an image forming apparatus according to the embodiment of the present invention. FIG. 1B is a perspective view with a part cut away at the time when a reading unit of the image forming apparatus according to the embodiment is opened. FIG. 2A is an exploded perspective view of an opening/closing mechanism of the reading unit when seen from the right-front direction. FIG. 2B is an exploded perspective view of the opening/closing mechanism of the reading unit when seen from the left-rear direction. FIG. 3 is a cross sectional plan view of a coupling stay and a cam lever at the time when the reading unit is closed. FIG. 4A is a right side elevational view illustrating the cam lever operation at the time when the reading unit is opened. FIG. 4B is a right side elevational view illustrating the cam lever operation at the time when the reading unit is closed. In the following description, when seen from the front surface of the apparatus, this side is defined as a front side, the right-handed direction is defined as a right side, the depth side is defined as a rear side, and the left-handed direction is defined as a left side, respectively.

A recording unit 1 forms an image onto a recording sheet by a recording head 2 based on image information. The recording sheet on which the image has been formed is ejected onto a discharge tray 3. A reading unit 5 reads the image on the original. The reading unit 5 is attached through the opening/closing mechanism so as to be closable around a hinge 4, as a center, provided in an upper portion of the recording unit 1. The opening/closing mechanism is constructed by a stay 6, a coupling base plate 7, a cam lever 9, an urging member, and the like. A rotary axis 6a is provided in one end portion of the stay 6. By fitting the rotary axis 6a into a supporting portion 5a of a front left bottom portion of the reading unit 5, the stay 6 is swingably coupled thereto. The rotary axis 6a is attached to the supporting portion 5a so as not to be pulled out therefrom. The coupling base plate 7 is arranged in a left upper portion of the recording unit 1. The coupling base plate 7 is fixed to a predetermined position of a frame or cover portion of the recording unit 1.

A projecting portion 6b having a flange portion 6c is provided for the other end portion of the stay 6. An L-shaped guide groove 8 along/into which the projecting portion 6b of the stay slides/is fitted is formed in the coupling base plate 7. The guide groove 8 has: a long groove portion 8a; a short groove portion 8b; and a bending portion 8c which connects the long groove portion 8a and the short groove portion 8b. As a whole form, the guide groove 8 has an L-character shape (L-shape). The projecting portion 6b of the stay 6 has been fitted into the guide groove 8. The projecting portion 6b moves reciprocatively along the guide groove 8 in an interlocking relational manner with the opening/closure of the reading unit 5. The flange portion 6c which is slightly widened is formed in a front edge portion of the projecting portion 6b of the stay 6. By sandwiching the guide groove 8, a pull-out preventing function is provided. The cam lever 9 is arranged in the coupling base plate 7 so as to be adjacent to a left side surface of the guide groove 8. The cam lever 9 is sandwiched between a left side surface of the coupling base plate 7 and a cover (or frame) of the recording unit 1 and attached.

By fitting an axis portion 9a of the cam lever 9 into a hole portion 7a of the coupling base plate 7, the cam lever 9 is supported to the coupling base plate 7 so that it can swing in two directions of a vertical direction (direction shown by an arrow Z in FIG. 1B) and a horizontal direction (direction shown by an arrow X in FIG. 1B). The cam lever 9 is urged in the oblique upper right direction by an extension spring 10 serving as an urging member suspended between the cam lever 9 and the coupling base plate 7. The cam lever 9 and the spring 10 construct a restricting unit, which will be described hereinafter. A plurality of cam portions such as stairway portions 9e and 9g, wall portions 9b and 9f, slope surfaces 9c and 9h, raised surface 9d, projecting portion 9i, and the like are formed on the cam lever 9. When the reading unit 5 is opened/closed, a predetermined cam portion is come into contact with or slides on the projecting portion 6b (or the flange portion 6c) of the stay 6 or a rib 7b of the coupling base plate 7.

The operations of the stay 6 and the cam lever 9 at the time when the reading unit 5 is opened/closed will now be described. When the reading unit 5 is closed, the stay 6 is in a state where it has almost horizontally been fallen (FIG. 3) and the projecting portion 6b of the stay 6 has been moved to a rearmost position (D in FIG. 4A) of the long groove portion 8a of the guide groove 8. Such a state is called a closed state hereinbelow. In FIGS. 4A and 4B, the cam lever 9 is shown by a solid line and the projecting portion 6b (stay 6) and the guide groove 8 (coupling base plate 7) are shown by an alternate long and two short dashes line.

When the reading unit 5 is slightly opened from the closed state, the projecting portion 6b is moved to the front side along the long groove portion 8a and reaches a position of E in FIG. 4A. At this time, the projecting portion 6b has passed through the slope surface 9c of the cam lever 9 and is in contact with the raised surface 9d which was raised to the right. Thus, the cam lever 9 swings to the left shown by the arrow X in FIG. 1B and its front edge portion (front side portion) is moved to the leftmost position. At this position, the wall portion 9b of the front edge portion of the cam lever 9 is not come into contact with the rib 7b of the coupling base plate 7 on the horizontal surface. Therefore, the cam lever 9 swings to the upper side shown by the arrow Z in FIG. 1B around the axis portion 9a by an urging force of the spring 10 and is moved to the upper position where the front edge portion has been moved upward as illustrated in FIG. 4A. At this time, even in the case where the motion of the cam lever 9 is dull due to a friction or the like, since the projecting portion 6b of the stay 6 is come into contact with the projecting portion 9i of the cam lever 9, so that the cam lever 9 is forcedly moved to the upper position.

When the reading unit 5 is further opened, the projecting portion 6b is moved to the bending portion 8c of the guide groove 8 and reaches a position of F in FIG. 4A. At this time, the reading unit 5 is in the full-open state. The projecting portion 6b of the stay 6 passes through the stairway portion 9e extending in the almost perpendicular direction of the cam lever 9 and the cam lever 9 swings to the right by a small amount. Thus, the wall portion 9b of the cam lever 9 is come into contact with the rib 7b of the coupling base plate 7 and generates a click sound. Subsequently, when the reading unit 5 is slightly closed, the backward progress of the projecting portion 6b of the stay 6 is restricted by the stairway portion 9e extending in the almost perpendicular direction of the cam lever 9. Therefore, the projecting portion 6b progresses downwardly along the short groove portion 8b and moves to a position of G in FIG. 4B as an edge portion of the short groove portion 8b.

At this time, the reading unit 5 is held in the opening state. Also, in this instance, the projecting portion 6b of the stay 6 pushes down the wall portion 9f of the cam lever 9 against the spring 10 and the cam lever 9 is moved to a lower position where its front edge portion has been fallen as illustrated in FIG. 4B. At this lower position, since the wall portion 9b of the cam lever 9 can pass through the lower side of the rib 7b of the coupling base plate 7, the cam lever 9 further swings to the right by the urging force of the spring 10. Thus, the projecting portion 6b of the stay 6 is come into contact with the cam lever 9 and generates a click sound. In the embodiment, the restricting unit for restricting so as to alternately guide the projecting portion 6b of the stay 6 to the long groove portion 8a and the short groove portion 8b by the cam lever 9 having a plurality of cam portions 9b to 9i and the spring 10 which urges the cam lever 9 in the oblique upper direction is constructed.

The operation which is executed when the reading unit 5 is closed from the opening state will be described. First, the reading unit 5 is temporarily opened to the full-open state. In the full-open state, the projecting portion 6b of the stay 6 is moved to a position of the bending portion 8c of the guide groove 8 shown by a position of H in FIG. 4B. At this time, a top edge portion of the wall portion 9b of the cam lever 9 is come into contact with a lower surface of the rib 7b of the coupling base plate 7 and the cam lever 9 is held at the lower position by an urging force of the spring 10. The projecting portion 6b of the stay 6 passes through the almost-horizontally extending stairway portion 9g of the cam lever 9 and is come into contact with the wall portion 9b, so that the cam lever 9 further swings to the right. In this instance, a click sound is generated when the projecting portion 6b collides with the wall portion 9b.

In full-open state of the reading unit 5, the downward movement of the projecting portion 6b of the stay 6 is restricted by the stairway portion 9g which extends almost horizontally. Therefore, by closing the reading unit 5, the projecting portion 6b is moved to the rear side along the long groove portion 8a. While the projecting portion 6b moves to a position of I in FIG. 4B, the projecting portion 6b passes along the slope surface 9h of the cam lever 9 and swings while being come into contact with the raised surface 9d. Thus, the cam lever 9 swings to the left around the axis portion 9a as a center and moves to the leftmost position. At this position, since the wall portion 9b of the front edge of the cam lever 9 is not come into contact with the rib 7b of the coupling base plate 7, the cam lever 9 swings upward around the axis portion 9a as a center by the urging force of the spring 10 and the front edge portion is moved to the upper position as illustrated in FIG. 4A.

When the reading unit 5 is further closed, the projecting portion 6b is moved to the position of D on the rear side of the long groove portion 8a while sliding with the raised surface 9d and the slope surface 9c. The stay 6 becomes almost horizontal and the reading unit 5 enters a state where it has perfectly been closed. At this time, even when the motion of the cam lever 9 is dull due to the friction or the like, since the projecting portion 6b of the stay 6 is come into contact with the projecting portion 9i of the cam lever on the way of movement to the rear side, so that the front edge portion of the cam lever 9 is forcedly moved to the upper position.

In the above construction, in the full-open state of the reading unit 5, the projecting portion 6b of the stay 6 is located in the bending portion 8c of the guide groove 8. The restricting unit constructed by the cam lever 9 having a plurality of cam portions 9b to 9i and the spring 10 which urges the cam lever 9 in the oblique upper direction restricts so as to alternately guide the projecting portion 6b to the long groove portion 8a and the short groove portion 8b when the projecting portion 6b moves from the bending portion 8c. When the projecting portion 6b moves from the bending portion 8c to the long groove portion 8a, the reading unit 5 is rotated to the closed state. When the projecting portion 6b moves from the bending portion 8c to the short groove portion 8b, the reading unit 5 is held in the opening state. That is, the cam lever 9 is swung in the two directions in an interlocking relational manner with the opening/closing operation of the reading unit 5, and the position of the cam lever 9 changes depending on the case where the projecting portion 6b has progressed from the long groove portion 8a to the bending portion 8c and the case where the projecting portion 6b has progressed from the short groove portion 8b to the bending portion 8c. Thus, the projecting portion 6b is alternately guided to either the long groove portion 8a or the short groove portion 8b and the opening/closing operation of the reading unit 5 can be alternately controlled.

In the foregoing embodiment, in the full-open state of the reading unit 5, the reading unit 5 can be alternately shifted to the opening holding state and the closed state in the next step. That is, when opening the reading unit 5, the projecting portion 6b is moved to the front side along the long groove portion 8a from the closed state. After that, it passes through the full-open state of the reading unit 5 where the projecting portion 6b is located in the bending portion 8c (position of F) and is shifted to a state where the reading unit 5 is held at the opening position where the projecting portion 6b is located in the edge portion of the short groove portion 8b (position of G). When closing the reading unit 5, the projecting portion 6b is moved upward along the short groove portion 8b from the state where the reading unit 5 is held at the opening position, and the reading unit 5 passes through the full-open state and allows the projecting portion 6b to be moved to the rear side along the long groove portion 8a, so that the reading unit 5 is shifted to the closed state where the projecting portion 6b is located at the position of D.

According to the above construction, the image forming apparatus having the opening/closing mechanism in which, in the opening/closing operation of the reading unit 5, the space saving can be accomplished and the operability can be improved by the simple and reasonable construction, is provided. The restricting unit is constructed by the cam lever 9 having a plurality of cam portions and the spring 10. Therefore, each time each step of the opening/closing operation of the reading unit 5 is completed, the sound due to a transition of the cam portions is generated, thereby enabling the operator to be promoted to execute the certain operation. Further, the cam portions of the cam lever 9 can be constructed so that the operator does not touch them carelessly. Thus, certainty of the opening/closing operation of the reading unit 5 can be extremely improved. The construction described in the foregoing embodiment can be effectively applied particularly in the case where the moment due to the weight of the reading unit itself or in an image forming apparatus separately having an urging unit, a braking unit, an attenuating unit, or the like for reducing the moment due to the weight of the reading unit itself.

Although the guide groove 8 having the bending portion 8c has been provided integratedly with the recording unit 1 in the foregoing embodiment, a construction in which the guide groove is provided for the reading unit 5 and one of the stays is swingably provided for the recording unit. Although the guide groove 8 along/into which the projecting portion 6b of the stay 6 slides/is fitted has been provided for the coupling base plate 7 fixed to the recording unit 1 in the foregoing embodiment, the guide groove may be formed in the stay and the projection to be fitted may be provided for the recording unit 1 or the reading unit 5. Further, an urging unit, a braking unit, an attenuating unit, or the like for reducing a dropping speed at the time when the operator releases the hand on the way of the opening/closing operation of the reading unit 5 may be provided as necessary.

The recording unit 1 in the foregoing embodiment may be either a recording apparatus of a serial type in which an image is formed by reciprocatively moving a recording head or a recording apparatus of a line type in which an image is recorded line by line in a lump only by a sheet feed by using a full-line recording head. The recording unit 1 may be any one of recording systems such as ink-jet recording system, thermal transfer system, thermosensitive system, laser beam system, wire-dot system, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-140450, filed May 29, 2008, which is hereby incorporated by reference herein in its entirety.

What is claimed is:

1. An image forming apparatus comprising:
   a recording unit configured to form an image onto a sheet;
   a reading unit rotatably supported to the upper portion of the recording unit so as to be openable and closable about one end as a fulcrum and reads an original;
   an L-shaped guide groove which is provided for one of the recording unit and the reading unit and in which a long groove portion and a short groove portion are connected by a bending portion; and
   a stay in which a projecting portion provided at one end is fitted into the guide groove and coupled therewith, the other end is swingably coupled with the other one of the recording unit and the reading unit, and the projecting portion moves reciprocatively along the guide groove in an interlocking relational manner with an opening/closure of the reading unit,
   wherein in a state where the projecting portion is located in the bending portion, the reading unit is in an opening state,
   in a state where the reading unit has been rotated to its closed state, the projecting portion is located in the long groove portion, in a state where the reading unit is held at its opening position, the projecting portion is located in the short groove portion, and
   the guide groove has a restricting mechanism configured to alternately guide the projecting portion to the long groove portion and the short groove portion when the projecting portion moves from the bending portion.

2. An apparatus according to claim 1, wherein
   the restricting mechanism has a cam lever which can be alternately moved to a first position and a second position,
   at the first position, the projecting portion which has progressed from the long groove portion to the bending portion is guided to the short groove portion, and
   at the second position, the projecting portion which has progressed from the short groove portion to the bending portion is guided to the long groove portion.

3. An apparatus according to claim 2, wherein
   one end of the cam lever is coupled with one of the units and the other end can swing in two directions,
   the restricting mechanism further has an urging member configured to urge the cam lever in a direction against the swing in the two directions, and
   by moving the projecting portion in an interlocking relational manner with the opening/closing operation of the reading unit, the cam lever which is come into engagement with the projecting portion is swung in the two directions and is moved to the first and second positions.

* * * * *